United States Patent
Schwald et al.

[11] Patent Number: 5,866,815
[45] Date of Patent: Feb. 2, 1999

[54] FILL-LEVEL INDICATOR

[75] Inventors: Rolf Schwald, Maulburg; Peter Klöfer, Steinen; Manfred Eckert, Todtnau, all of Germany

[73] Assignee: Endress +Hauser GMbH +Co., Maulburg, Germany

[21] Appl. No.: 351,389
[22] PCT Filed: Mar. 24, 1994
[86] PCT No.: PCT/DE94/00339
§ 371 Date: Dec. 9, 1994
§ 102(e) Date: Dec. 9, 1994
[87] PCT Pub. No.: WO94/24524
PCT Pub. Date: Oct. 27, 1994

[30] Foreign Application Priority Data
Apr. 10, 1993 [DE] Germany ............ 43 11 963.8

[51] Int. Cl.⁶ .................................................. G01F 23/00
[52] U.S. Cl. .................................................. 73/290 V
[58] Field of Search .................. 73/1 H, 29 OV, 73/632, 866.5, DIG. 1, 4

[56] References Cited

U.S. PATENT DOCUMENTS

| | | | |
|---|---|---|---|
| 3,239,696 | 3/1966 | Burkhalter et al. . | |
| 3,376,438 | 4/1968 | Colbert . | |
| 3,771,117 | 11/1973 | Shaffer et al. | 340/8 |
| 4,536,673 | 8/1985 | Forster | 310/327 |
| 4,616,152 | 10/1986 | Saito et al. | 310/334 |
| 4,728,844 | 3/1988 | Wilson et al. | 310/327 |
| 5,191,316 | 3/1993 | Dreyer . | |
| 5,274,296 | 12/1993 | Hiki et al. | 310/327 |
| 5,457,352 | 10/1995 | Mueller et al. . | |

FOREIGN PATENT DOCUMENTS

| | | |
|---|---|---|
| 853 355 | 10/1952 | Germany . |
| 21 52 675 | 3/1973 | Germany . |
| 0 340 624 | 11/1989 | Germany . |
| 40 27 949 | 3/1992 | Germany . |
| 92 09 977.7 | 1/1993 | Germany . |
| 42 30 773 | 2/1994 | Germany . |
| 52-78457 | 6/1977 | Japan . |

Primary Examiner—Ronald L. Biegel
Assistant Examiner—Jewel Thompson
Attorney, Agent, or Firm—Bose McKinney & Evans

[57] ABSTRACT

Proposed is a fill-level indicator designed to indicate the level of the contents of a container or the storage level of a material at a storage place, the indicator having an ultrasonic transducer which is operated to act alternately as a pulse emitter and as a receiver. The ultrasonic transceiver (31,33, 35) is surrounded by the fill-level indicator housing (21) to form an exactly cylindrical coaxial air gap (38) and has boundary surfaces which produce acoustic impedance jumps to reflect the acoustic energy emitted by the surface of the piezoelectric crystal (31).

18 Claims, 2 Drawing Sheets

FILL-LEVEL INDICATOR

BACKGROUND OF THE INVENTION

1. Field of the Invention

The invention pertains to a fill-level indicator for indicating the level of the contents of a container or the storage level of a material at a storage place, whereby said indicator comprises an ultrasonic transducer that is surrounded by a housing and operated to act alternately as a pulse emitter and as a receiver for the pulses reflected on the surface of the material and an electric circuit for exciting the transducer.

2. Description of Prior Art

Fill-level indicators of this type are frequently utilized for monitoring different processes, e.g., detecting the fill-level of containers or storage places or ascertaining similar measuring values required for carrying out said processes. Such indicators are used for determining the fill-level, i.e., the contents of a container or the storage level at a storage place, from the time that elapses while the pulse travels from the membrane of the ultrasonic transducer to the surface of the material that acts as the plane of reflection and back to the transducer.

In order to generate the original pulse, the ultrasonic transducer that is surrounded by a housing comprises a piezoelectric crystal that is excited to oscillate at the frequency of the ultrasonic wave via the original pulse generator formed by the electric circuit. According to the state of the art, the face surface of the piezoelectric crystal that faces the membrane of the transducer and a short section of the outer surface of the piezoelectric crystal is covered by a plastic layer that serves for adapting the acoustic impedance of the ceramic material of the crystal to the acoustic impedance of the medium into which the acoustic pulse is emitted.

At the side situated opposite the membrane, a damping layer consisting of plastic fills out the remaining part of the inner space of the housing. This plastic surrounds the other face surface as well as the largest portion of the outer surface of the piezoelectric crystal. The damping layer is provided so as to influence the oscillating behavior of the crystal in such a way that the oscillating direction is essentially oriented toward the membrane and the emission of oscillation energy is damped in any other direction.

According to German Patent Application No. P 4,230, 773.2, this damping layer may be composed of a silicone elastomer with a high content of metal oxides. Such a damping layer influences the oscillating behavior of the crystal and prevents the undesired emission of oscillation energy in the radial direction as well as the axial direction extending away from the membrane.

With sensors in which the inner housing is filled with a plastic layer, this may, however, not be realized entirely due to the promotion of the sound propagation by the plastic layer, so that a residual quantity of acoustic energy is still emitted primarily in the radial direction from the outer surface of the crystal and consequently not available as acoustic energy that is directed toward the material. If using the fill-level indicator for measuring the level of the contents in a container, this radially emitted acoustic energy is reflected on the container wall, on installations, or on the inner walls of sound conveyance pipes and consequently directed into the measuring space which, in turn, leads to the fact that the measurement is influenced by interfering secondary echoes.

Increasing the wall thickness of the plastic layer enclosing the outer surface of the piezoelectric crystal such that the sound propagation path is elongated and the sound absorption is increased is usually done in an attempt to eliminate this disadvantage. The arrangement of a layer that consists of a cellular material and surrounds the piezoelectric crystal between the crystal and the plastic layer is intended to attain the same objective.

On the other hand, the total diameter of the housing of such an indicator should be as small as possible so as to allow the opening in the container, through which the indicator is inserted into the housing or the diameter of a sound conveyance pipe, to be designed correspondingly small.

One electroacoustic transducer of the same type is disclosed in German Patent No. 4,027,949. This patent proposes damping the undesired sound emission extending parallel to the axial direction of the acoustic head by means of a filler ring that surrounds the acoustic head, while forming an intermediate space, that consists of a plastic material that is reinforced with glass fibers. However, the aforementioned publication does not propose any measures for reducing or preventing sound waves that are emitted in the radial direction.

SUMMARY OF THE INVENTION

In contrast to the aforementioned publications, the present invention is based on the objective of proposing a fill-level indicator in which the emission of acoustic energy that interferes with the measurement and is triggered by the outer surface of the piezoelectric crystal is prevented or at least reduced additionally without having to increase the outer diameter of the indicator.

In order to attain this objective, the invention abandons the idea of reducing the sound absorption by extending the damping distance, but rather utilizes the multiple reflections of the acoustic pulse that occur on the boundary surfaces of the material and are caused by acoustic impedance jumps.

The aforementioned objective is attained with the combination of an adaptation layer covering a first axially facing surface of the piezoelectric crystal, a damping layer covering a second axially facing surface of the piezoelectric crystal, two housings, and a retainer for retaining one housing coaxially in the other housing so that an inner wall of one housing and an outer wall of the other housing form a coaxial air gap which creates material boundary surfaces to reflect acoustic energy emitted radially from the surfaces of the piezoelectric crystal.

One advantageous embodiment of the invention is disclosed herein.

Additional characteristics and advantages are illustrated in one embodiment.

DESCRIPTION OF THE PREFERRED EMBODIMENT

Figure 1:
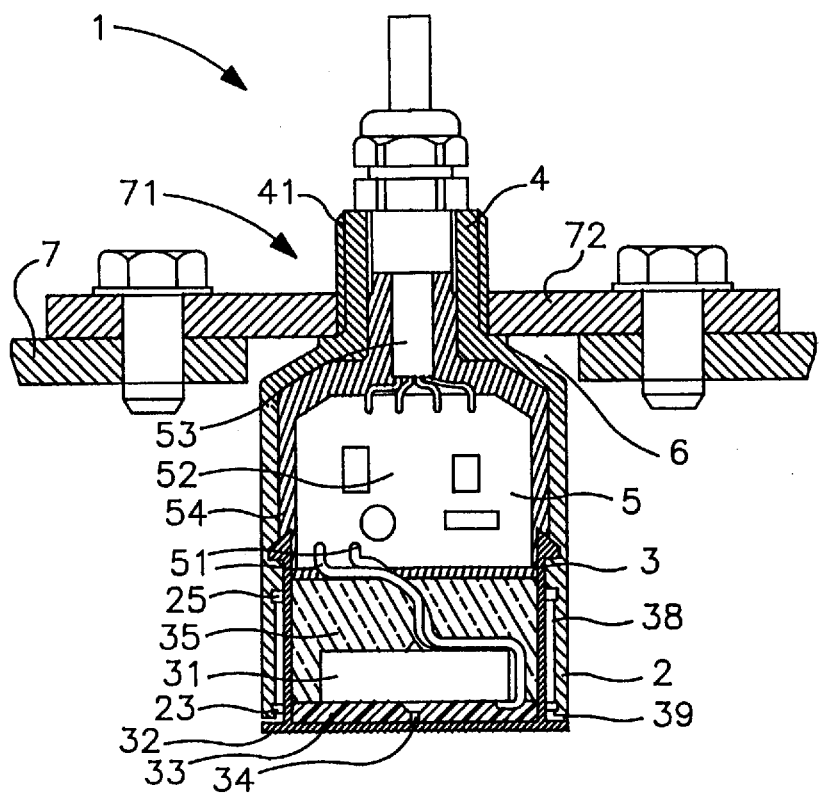
FIG. 1: a section through the ultrasonic transducer.

FIG. 1 shows an ultrasonic transducer indicated by reference numeral 1 and serves for indicating the level of the contents of a container or the storage level of a material at a storage place. The ultrasonic transducer consists of a housing 2, transducer housing 3, connecting part 4, as well as the original pulse generator 5.

The ultrasonic transducer 1 is inserted into the inner space of a container, not shown in the figures, through the opening 6. The container is closed with a cover 7 of which only a short section is illustrated. A threaded bolt 41 of the connecting part 4 penetrates through a central bore 71 of the connecting flange 72 in order to fasten the ultrasonic transducer 1. The threaded bolt 41 and the flange 72 form a separable connection by means of which the ultrasonic transducer 1 is retained on the connecting flange 72.

The piezoelectric crystal 31 is arranged inside of the pot-shaped transducer housing 3. The base of the transducer housing 3 forms the membrane 32 of the ultrasonic transducer. At the side facing the membrane 32, the face surface of the piezoelectric crystal, as well as a short section of the outer surface of the piezoelectric crystal 31, is covered with the adaptation layer 33. This is realized by retaining the piezoelectric crystal 31 at an exactly defined distance from the membrane 32 via short supports 34.

The inner space of the transducer housing 3 situated opposite the membrane 32 is entirely filled by the damping layer 35. Consequently, the piezoelectric crystal 31 is covered by the damping layer 35 on its outer surface as well as its face surface situated opposite the membrane 32. Electric connecting lines 51 connect the piezoelectric crystal 31 with the original pulse generator 5 formed by an electric circuit 52. This original pulse generator is electrically connected with an evaluation device arranged at a distance from the measuring space via one additional electric line 53.

Figure 3:
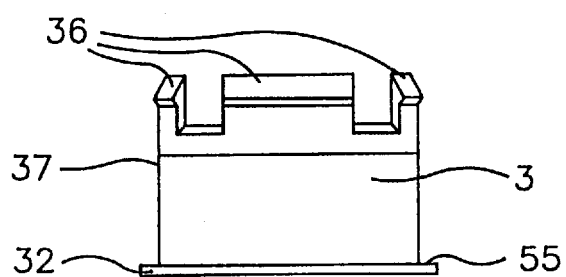
FIG. 3: a top view of the transducer housing that surrounds the piezoelectric crystal and the adaptation layer as well as the damping layer.

FIG. 3 shows that the pot-shaped transducer housing 3 is provided with locking springs 36 on its end situated opposite the membrane 32. These locking springs are evenly distributed over the periphery of the transducer housing 3. The function of these locking springs 36 will be discussed in detail below. The pot-shaped transducer housing 3 is preferably manufactured as a molded part consisting of a polypropylene.

The original pulse generator 5 generates an electric original pulse and excites the piezoelectric crystal 31 to oscillate at the frequency of the ultrasonic wave via the electric connecting lines 51. The acoustic energy is essentially emitted from the face surfaces of the crystal 31 in the axial direction. However, part of this energy is also emitted from the outer surface of the crystal 31 in the radial direction. The plastic layer 33, which faces the membrane 32 and fills the intermediate space between the membrane 32 and the crystal 31, causes an adaptation of the acoustic impedance of the ceramic material of the piezoelectric crystal 31 to the impedance of the media into which the acoustic pulse is emitted.

The damping layer 35 that fills the remaining inner space of the pot-shaped transducer housing 3 damps the emission of energy in the radial direction as well as the axial direction extending away from the membrane 32. Since this plastic layer not only causes a damping of the emitted energy but also an impedance adaptation, the undesired emission of energy may not be prevented entirely. While a reduction of the emission in the axial direction extending away from the membrane 32 currently no longer represents a problem, a satisfactory solution with respect to the radial emission has not been found so far. Although it was attempted to reduce the emission of radial oscillation energy by increasing the sound absorption, namely by expanding the sound propagation path via the damping layer, this measure is always associated with an increase in the dimensions of the housing diameter and may not be realized in the ideal fashion.

The transition of acoustic energy from one material to another material causes an acoustic impedance jump at the boundary surfaces of the material which, in turn, leads to a partial reflection of the acoustic pressure wave. The same also applies to the transition from plastic to air. This transition of the acoustic energy on the boundary surfaces of the material depends to a high degree on the ratio between the acoustic impedances $Z_1$ and $Z_2$ of the two materials. The reflection factor r for the acoustic pressure is calculated in accordance with the formula $$r=(Z_1-Z_2)/(Z_1+Z_2).$$

With materials, the characteristic acoustic impedance of which differs by the factor 5, this results in a reflection factor of 0.67. This means that the acoustic pressure was lowered to 33% of its original intensity after passing through the boundary surfaces of the material. After passing through the boundary surfaces of two materials, this value is reduced to 11% of its original intensity. Very high coefficients of reflection result during the transition of the acoustic pressure from plastic to air, i.e., a large portion of the pressure wave is reflected. Since this effect does not depend on the thickness of the materials, it is, for example, possible to construct the housing walls very thin or design the distances to the housing walls to be very small.

Figure 2:
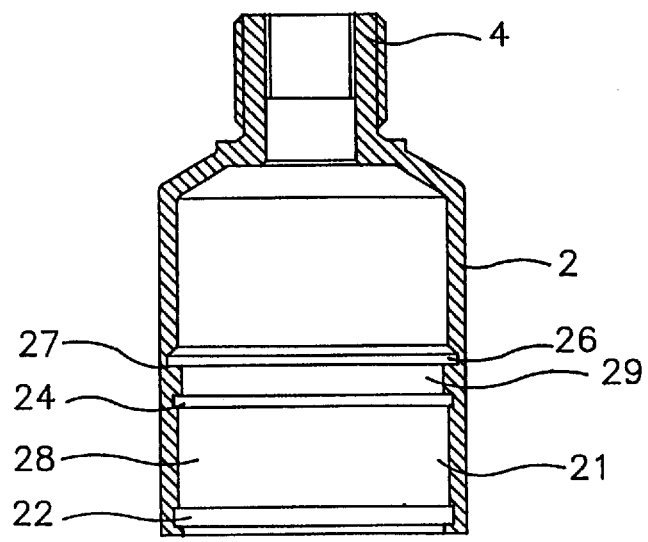
FIG. 2: a section through the housing of the ultrasonic transducer as an individual component.

The invention utilizes this effect due to the fact that the transducer housing 3 penetrates the opening 21 in the housing 2 coaxially, that the transducer housing is separated from the housing 2 via an exactly defined thin air gap 38 that has a cylindrical shape and extends in the radial direction, and that structure-born sound is decoupled additionally within the region of the outer surface of the piezoelectric crystal 31. This is realized by arranging three short cylindrical sections of larger diameter in such a way that they surround the opening 21 of the housing 2 as shown in FIGS. 2 and 3. The first section situated opposite the connecting part 4 has such a diameter and width that it forms a groove 22 of round cross section for accommodating a flexible, annular seal 23.

The second, central section also forms a groove 24 that serves for accommodating an annular seal 25. The annular seals 23 and 25 may be formed of customary O-rings.

The third section 26 is somewhat wider and has such a cross section that its annular surface facing the groove 24 forms a shoulder 27 that serves for bracing the locking springs 36 if the transducer housing 3 is inserted into the opening 21.

A longer section 28, the diameter of which is approximately 2 mm larger than the diameter of the section 29 extending between the groove 24 and the section 26, extends between the grooves 22 and 24. The section 29 in cooperation with the seals 23 and 25 forms the exact guidance of the outer surface 37 of the transducer housing 3 in the opening 21 of the housing 2. The inner wall of the section 28 of the housing 2 and the outer surface 37 of the transducer housing 3 consequently form an exactly defined cylindrical air gap 38 with a thickness of approximately 1 mm or less and a length of approximately 25 mm. The air gap 38 surrounds the outer surface of the piezoelectric crystal 31. The air gap 38 causes, in the boundary surfaces of the material, a transition from plastic to air, subsequently a transition from air to plastic and a transition from plastic to air once again at the outer surface of the housing 2. Each of these transitions triggers a partial reflection of the sound wave that is caused by the acoustic impedance jump.

The membrane 32 of the transducer housing 3 extends radially beyond the outer surface 37, so that its periphery coincides with the periphery of the housing 2. In the inserted and locked position, the annular surface 55 of the membrane 32 facing the face side of the housing 2 does not directly adjoin the face surface of the housing 2, but a second air gap 39 that extends in the radial direction and has a thickness of approximately 0.2 mm is formed between these two components.

The housing 2 also may be manufactured as a molded part consisting of a polypropylene.

FIG. 1 shows that parts 2 and 3 are assembled in such a way that the connecting line 53 is initially electrically connected with the electric circuit 52 and inserted into the opening 21 of the housing 2. The original pulse generator 5 assumes the position shown in FIG. 1. After inserting the annular seals 23 and 25, the preassembled transducer housing 3 is inserted into the opening 21 until the transducer housing 3 assumes the position shown in FIG. 1 and the locking springs 36 are engaged on the shoulder 27 of the housing 2. Once the components 3 and 5 are arranged in this position inside the housing 2, the remaining free space may be filled with a suitable sealing compound 54.

The transducer housing 3 is now separated from the housing 2 via a precisely defined and exactly cylindrical air gap that has an annular shape and extends in the radial direction. The two seals 23 and 25 permanently seal the cylindrical air gap, namely also under difficult conditions, and cause an additional decoupling of the structure-born sound from the region of the transducer housing 3 situated opposite the outer surface from the housing 2.

Due to the three material transitions, namely transducer housing 3--air gap, air gap--housing 2, housing 2--measuring space, the characteristic acoustic impedances for the material plastic $Z_K \sim 2 \times 10^6$ $N_s/m^3$ and air $Z_L \sim 400$ $N_s/m^3$ result in a reduction of the acoustic pressure emitted radially on the outer surface of the piezoelectric crystal 31 that is 45–50 Db lower compared to a direct emission into air.

It goes without saying that the acoustic impedance jumps also may be obtained by the boundary surfaces of different materials.

We claim:

1. Fill-level indicator for indicating the level of material in a container wherein the indicator includes an ultrasonic transducer which is operated to act alternatively as a pulse emitter and as a receiver for pulses reflected on the surface of the material and an electric circuit for exciting the transducer, the indicator comprising a first housing (2), a second housing (3) surrounding the transducer (31) and having a membrane (32), an adaptation layer (33) covering a first axially facing surface of the transducer (31) for adapting acoustic impedance of the transducer (31), a damping layer (35) covering a second axially facing surface of the transducer (31) for damping acoustic energy emitted axially from the transducer (31), flexible seals (23, 25) for retaining the second housing (3) coaxially in an opening (21) of the first housing (2) at a defined distance from the first housing, grooves (22, 24) for accommodating the flexible seals (23, 25) arranged on the first housing (2) such that they extend around the opening (21), an inner wall of the first housing (2) and an outer wall of the second housing (3) forming a coaxial air gap (38) and creating material boundary surfaces to reflect acoustic energy emitted radially from surfaces of the transducer (31).

2. Fill-level indicator for indicating the level of material in a container wherein the indicator includes an ultrasonic transducer which is operated to act alternatively as a pulse emitter and as a receiver for pulses alternatively as a pulse emitter and as a receiver for pulses reflected on the surface of the material and an electric circuit for exciting the transducer, the indicator comprising a first housing (2) having an opening (21), a second housing (3) surrounding the transducer (31), the second housing (3) being positioned in the opening (21) of the first housing (2), an adaptation layer (33) covering a first axially facing surface of the transducer (31) for adapting acoustic impedance of the transducer (31), a damping layer (35) covering a second axially facing surface of the transducer (31) for damping acoustic energy emitted axially from the transducer (31), flexible seals (23, 25) for retaining the second housing (3) coaxially in the opening (21) of the first housing (2) at a defined distance from the first housing, grooves (22, 24) for accommodating the flexible seals (23, 25) arranged on the first housing such that they extend around the opening (21), an inner wall of the first housing (2) and an outer wall of the second housing (3) forming a coaxial air gap (38) and creating material boundary surfaces to reflect acoustic energy emitted radially from surfaces of the transducer (31).

3. Fill-level indicator according to claim 1, characterized by the fact that the coaxial air gap (38) has a width of 1 mm or less.

4. Fill-level indicator according to claim 1, characterized by the fact that the coaxial air gap (38) extends in the axial direction along at least a radially outwardly facing surface of the transducer (31), a section of the adaptation layer (33) and a section of the damping layer (35).

5. Fill-level indicator according to claim 1, characterized by the fact that the first housing (2) comprises an axially extending section (28) of defined diameter, whereby said axially extending section in cooperation with the outer wall (37) of the second housing (3) forms the coaxial air gap (38).

6. Fill-level indicator according to claim 1, characterized by the fact that peripheral locking springs (36) are arranged on the second housing (3), namely on the side of the outer wall (37) situated opposite the membrane (32).

7. Fill-level indicator according to claim 6, characterized by the fact that the first housing (2) comprises a locking groove (26) having a shoulder (27) and the locking springs (36) of the second housing (3) engage the shoulder (27) of the locking groove (26).

8. Fill-level indicator according to claim 7, characterized by the fact that the axial distance between the shoulder (27) of the housing (2) and the membrane (32) of the second housing (3) form an annular air gap (39) that extends in the radial direction.

9. Fill-level indicator according to claim 8, characterized by the fact that the membrane (32) of the second housing (3) extends radially beyond the outer wall (37) and forms an annular wall (55) of the radially extending air gap (39) at the side situated opposite the acoustic emission.

10. Fill-level indicator according to claim 9, characterized by the fact that the radially extending air gap (39) is formed by the inner wall of the first housing (2) and the annular wall (55) of the membrane (32).

11. Fill-level indicator according to claim 10, characterized by the fact that the radially extending air gap (39) has a thickness of 0.2 mm or less.

12. Fill-level indicator according to claim 8, characterized by the fact that the second housing (3) is decoupled from the structure-born sound of the first housing (2) at least within the region of the radially outwardly facing surface of the transducer (31) via the air gaps (38, 39).

13. Fill-level indicator according to claim 1, characterized by the fact that the first housing (2) as well as the second housing (3) are manufactured as molded parts consisting of a polypropylene.

14. Fill-level indicator according to claim 3, characterized by the fact that the coaxial air gap (38) extends in the axial direction along at least the radially outwardly facing surface of the transducer (31), a section of the adaptation layer (33) and a section of the damping layer (35).

15. Fill-level indicator according to claim 3, characterized by the fact that the first housing (2) comprises an axially extending section (28) of defined diameter, whereby said axially extending section in cooperation with the outer wall (37) of the second housing (3) forms the coaxial air gap (38).

16. Fill-level indicator according to claim 4, characterized by the fact that the first housing (2) comprises an axially extending section (28) of defined diameter, whereby said axially extending section in cooperation with the outer wall (37) of the second housing (3) forms the coaxial air gap (38).

17. Fill-level indicator according to claim 14, characterized by the fact that the first housing (2) comprises an axially extending section (28) of defined diameter, whereby said axially extending section in cooperation with the outer wall (37) of the second housing (3) forms the coaxial air gap (38).

18. Fill-level indicator according to claim 6, characterized by the fact that the first housing (2) comprises a locking groove (26) having a shoulder (27) and the locking springs (36) of the second housing (3) engage the shoulder (27) of the locking groove (26).

\* \* \* \* \*